Feb. 17, 1970  W. W. MINER  3,495,487
METHOD OF AND APPARATUS FOR SLITTING SOD PADS
Filed Jan. 9, 1967  2 Sheets-Sheet 1
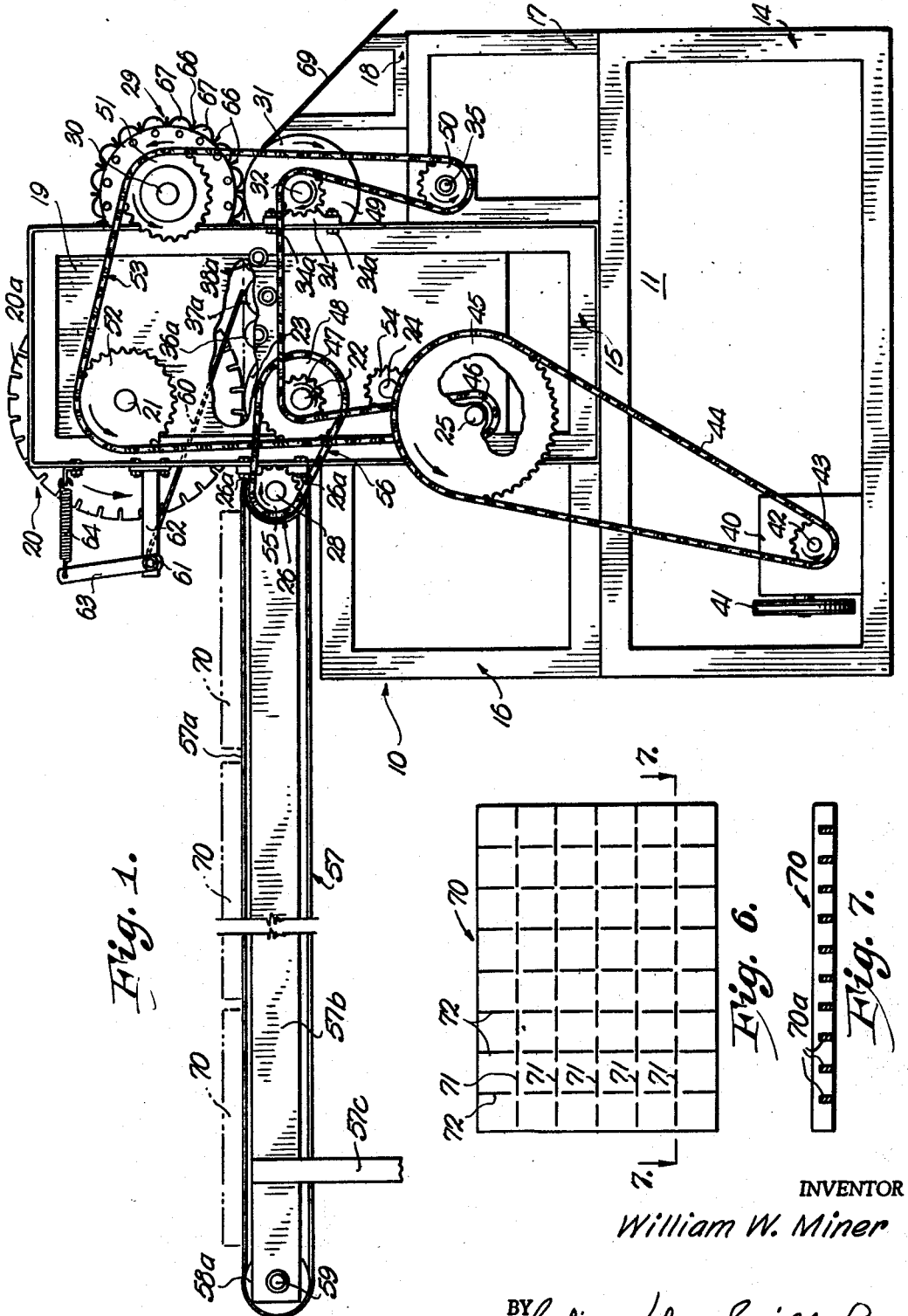
INVENTOR
William W. Miner
BY Seyfield, Kokjer, Seyfield & Lowe
ATTORNEYS

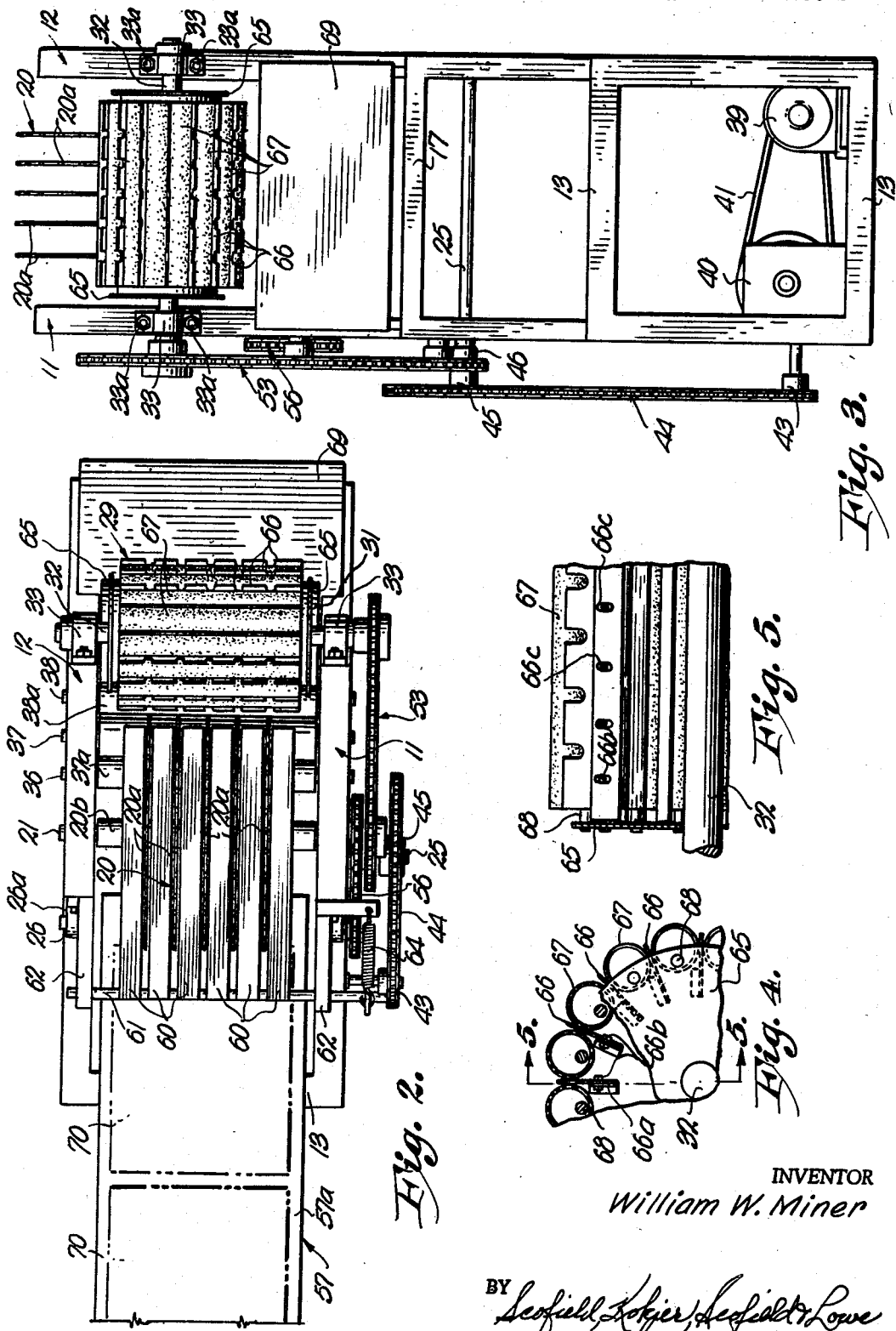

United States Patent Office 3,495,487
Patented Feb. 17, 1970

3,495,487
METHOD OF AND APPARATUS FOR SLITTING SOD PADS
William W. Miner, Cranbury, N.J. 07821
Filed Jan. 9, 1967, Ser. No. 608,009
Int. Cl. B26d 3/12
U.S. Cl. 83—117      14 Claims

ABSTRACT OF THE DISCLOSURE

An apparatus for automatically slitting sod pads having two oppositely oriented rotary cutter assemblies. One cutter assembly making selectively spaced longitudinal slits in the sod pad as it is moved through the apparatus. The remaining cutter assembly further slitting the sod pad with selectively spaced transverse slits thereby forming a grid-like cut over the surface of the sod pad.

BRIEF DESCRIPTION AND BACKGROUND OF THE INVENTION

The apparatus is structurally supported by two upright frames. The frames serve as a means for interconnecting and supporting two oppositely oriented cutter assemblies. The first cutter assembly includes a plurality of notched rotatable blades and a rolling mandrel located in close proximity to these blades. The second cutter assembly is mounted to the rear of the first cutter assembly and includes a plurality of notched knives rotatable with a horizontally oriented shaft and an associated rolling mandrel likewise located in close proximity to the end extremity of the knives. A conveyor belt is located at the forward end of the apparatus and is arranged so as to deliver sod pads to the first cutting assembly. As the pads are passed through the first cutter assembly, selectively spaced longitudinal slits are made in the sod pad. After passing through the first cutting assembly the sod pad is then presented to the second cutting assembly, same being operable to transversely slit the sod pads as the pad passes between the rotatable knife assembly and the second rolling mandrel.

The physical orientation of the notched blades and notched knives are such that the eventual grid-like cut over the surface of the sod pad does not completely sever the pad into individual units but leaves unsevered portions of the pad, due to the presence of the notches and the regulated depth of the cut, thereby forming a prepared sod pad of contiguously attached sod plugs.

It is almost universally recognized that the aesthetic appearance and general beautification of homes, parks, athletic fields, country clubs and military installations are greatly enhanced by the presence of a flourishing luxurious grass or sod thereabout. In most areas of the United States and many foreign countries, Zoysia grass is a highly favored type of resodding gras. Resodding or regrassing of lawns, malls or athletic fields, etc. may be accomplished by placing a small turf or plug of Zoysia sod on about eighteen (18) inch centers throughout the area to be resodded. If the soil surface is relatively bare or otherwise free of vegetation, the plugs will close the space between themselves within a year, thereby resulting in a thick, luxurious grass of a desirable texture completely covering the subject area.

A particularly convenient and economical way to prepare, handle and sell Zoysia plugs is to slit sod pads in such a manner that the pad remains intact but is comprised of easily detachable sod plugs properly sized for immediate use.

Therefore, a primary object of the invention is to provide a unique method and apparatus for forming detachable sod plugs in sod pads.

Another object of the invention is to provide a rugged, low maintenance, electrically operated apparatus which is capable of slitting a moving sod pad in a grid-like cut to thereby form contiguously attached sod plugs which are easily detachable from the now processed pad.

Another object of the invention is to provide a time and labor saving apparatus which automatically prepares a sod pad for retail packaging. The preparation includes conveying a sod pad toward and into cutting relationship with a means for making a set of parallel spaced apart intermittent longitudinal slits in said pad; then conveying and directing the longitudinally slit pad into cutting relationship with a means for making spaced apart intermittent transverse slits in said pad thereby resulting in a grid-like cut over the surface of the pad. This grid-like cut, as a result of the slits throughout the body of the sod pad, forms the array of individual detachable plugs which are contiguously connected by unsevered portions of the sod pad.

A further object of the invention is to provide a sod cutting apparatus of the character described which can be continuously operated to prepare a large volume of sod pads with a minimum of attendant personnel.

Another object of the invention is to provide a unique method for forming detachable sod plugs in the surface of sod pads, said method including steps of cutting a first set of parallel longitudinal slits substantially the entire length of and into one surface of said pad, transporting the longitudinally cut pad thence into cutting relationship with a second cutter assembly, and cutting a second set of parallel slits across substantially the entire width of the same surface at a substantial angle to said longitudinal slits in said pad.

A still further object of the invention is to provide a sod cutting apparatus which includes a means for regulating and controlling the depth of the slitting to thereby give the option of completely severing said pad or severing said pad to a limited depth. If the pad is only cut to a limited depth during the slitting of same, the bottom or lower portion of the pad is intact, however, the individual sod plugs are still easily detached from the complete pad.

Other and further objects of the instant invention will appear in the course of the following description thereof.

In the drawings, which form a part of the instant specification and are to be read in conjunction therewith, embodiments of the invention are shown and, in the various views, like numerals are employed to indicate like parts.

FIG. 1 is a side elevational view of the automatic sod cutting device embodying the invention with portions broken away to illustrate internal components and showing the sod pads in broken lines on the conveyor moving toward the longitudinal cutter assembly;

FIG. 2 is a top plan view of the device shown in FIG. 1;

FIG. 3 is a side view of the invention looking at the device in FIG. 1 from the right-hand end;

FIG. 4 is a partial sectional end view of the transverse cutter assembly;

FIG. 5 is a view taken substantially along the line 5—5 of FIG. 4 in the direction of the arrows;

FIG. 6 is a bottom plan view of a typical sod pad after same has been processed by said sod-cutting device; and FIG. 7 is a sectional view taken along the line 7—7 of FIG. 6 in the direction of the arrows with the area of said pad uncut by said longitudinal cutter assembly shown in section.

DETAILED DESCRIPTION

Referring initially to FIGS. 1, 2 and 3, reference numeral 10 generally depicts the support framework for the sod cutting device. The support framework is comprised of at least two identical sides 11 and 12, which are rigidly connected or formed integrally with the horizontal beams generally shown at 13 (FIGS. 2 and 3).

Turning now more particularly to FIG. 1, side 11 is generally constructed of two larger rectangular beam structures 14 and 15, and three smaller support beam structures 16, 17 and 18, welded to suitable portions of beam structures 14 and 15. Sides 11 and 12 are identically constructed and when the two sides are connected with the horizontal beams 13, a very rugged and stable supporting structure is thereby obtained.

Continuing with the discussion of the construction of the rectangular beam sections 15, a side plate 19 is welded substantially the length thereof, thusly forming a support, for various shaft and bearing components, to be discussed later. As mentioned above, both side 11 and side 12 contain an identical rectangular beam section 15 so that when the support framework is erected, beam sections 15 are vertically aligned opposite each other and thusly support the opposed side plates 19 for mounting purposes.

The various shafts, which rotatably carry the associated drive sprockets and cutter assemblies, are generally supported between plates 19 or on the vertical beams of sections 15. For example, the longitudinal cutter assembly 20, which will be discussed in more detail infra, is carried on shaft 21. Shaft 21 is journaled at each end on bearings secured to side plates 19, thereby providing the necessary support for the horizontally oriented shaft and cutter assembly. Shaft 22, aligned below shaft 21, carries a first rolling mandrel 23 and is likewise journaled at each end on bearings which are secured to side plates 19. An idler shaft 24 is rotatively mounted in plate 19 of side 11 and is physically located between shaft 23 and the main drive shaft 25 for chain tightening purposes. In a similar manner, drive shaft 25 is journaled on suitable bearings and horizontally supported between said side plates.

A semi-round clip 26 is bolted on the forward edge of the vertical beam of each rectangular section 15 by bolts 26a. Clips 26 fixedly locate bearings on the aforementioned vertical beams in the same horizontal plane. These bearings allow each end of conveyor drive shaft 28 to be journaled thereon. Shaft 28 rigidly supports the delivery end portion of the sod pad conveyor, to be described later.

Transverse cutter assembly 29 and a second rolling mandrel 31 are rotatively mounted on the output or right side, as seen in FIG. 1, of the vertical beams of sections 15 by shafts 30 and 32, respectively. The cutter assembly drive shaft 30 and the vertically aligned mandrel shaft 32 are affixed to the rear vertical beams of sections 15 in a manner similar to the mounting of conveyor drive shaft 28 in that clips 33 (FIG. 3) and 34 (FIG. 1) bolted at 33a and 34a, respectively, provide the bearing supports for their respective shafts. A second idler shaft 35 is similarly rotatively secured to the beam section 17. This shaft is located below and outwardly of the vertically aligned shafts 30 and 32.

Intermediate of drum shaft 23 and 32 are three transfer roller shafts 36, 37 and 38 which are likewise journaled at each end on their respective bearings secured to the spaced apart side plates 19. Shafts 36, 37 and 38 are mounted for free rotation and carry transfer rollers 36a, 37a and 38a, respectively, thereon. As roller 37a is of a larger diameter than rollers 36a and 38a, shaft 37 lies below shafts 36 and 38, however the upper surfaces of all the transfer rollers lie in the same horizontal plane including the upper surfaces of mandrels 22 and 31.

Turning now to the drive mechanism for the various rotative elements, an electric motor 39 drives worm gear reducer 40 with endless belt 41. The power output shaft of the worm gear reducer 41, indicated by numeral 42, has sprocket 43 mounted on its end extremity portion for the purpose of drivingly engaging endless chain 44. As seen in FIGS. 1 and 3, chain 44 connectively links sprocket 43 with sprocket 45 for the purpose of driving same. Sprocket 45 integrally connects with shaft 25 and imparts its rotative motion to said shaft. Also, rotatable with shaft 25 and mounted thereon is sprocket 46 of approximately the same size and ratio as drive sprocket 43. Drive shaft 22 has a pair of sprockets 47 and 48 affixed on one end thereof with sprocket 47 lying in the same vertical plane as sprocket 46 and being of equal ratios. Also of equal ratios and in the same plane are sprockets 49, drivingly affixed to shaft 32 and idler sprocket 50, affixed to idler shaft 35. Located above but still in the same plane are sprockets 51 and 52 which drivingly connect with the transverse cutter assembly drive shaft 30 and longitudinal cutter assembly drive shaft 21, respectively. Endless chain 53, driven by the rotational movement of sprocket 46 links sprockets 47, 48, 49, 50, 51 and 52, as well as an optional tightening idler sprocket 54 mounted on idler shaft 24. Accordingly, rotation of sprocket 46 rotates shafts 21, 22, 30 and 32 and their respective mandrels and/or cutting assemblies. As will be described later in greater detail, the cutter assemblies 20 and 29 are rotated counterclockwise while mandrels 23 and 31 are rotated clockwise when viewed from side 11 as in FIG. 1.

As mentioned above, sprocket 48 is located inwardly of sprocket 47, both sprockets being rotatable with shaft 23. Sprocket 55 is mounted on rotatable shaft 28 of the conveyor apparatus and lies in the same plane (vertical) as sprocket 48 and linked therewith by endless chain 56. Semi-round clips 26 securely locate bearing mounted shaft 28, carrying sprocket 55, to the forward or left-hand side (FIG. 1) of the vertical beams of sections 15. This secure connection also enables the delivery or right-hand end (FIG. 1) of a conventional conveyor 57 to be supported adjacent the lower portion of cutter assembly 20 in close proximity to the upper surface of mandrel 23. Conveyor 57 is of the endless moving belt type, said belt (hereinafter designated as 57a) being driven by roller 58 (not shown) carried on shaft 28 at the delivery or right-hand end and looped around a second roller 58a carried by an idler shaft 59 at its opposite end. Shafts 28 and 59 are separated by the usual framework generally designated at 57b, same being supported at one end by legs 57c. Belt 57a is capable of delivering sod pads from the left-hand or intake end to the right-hand or delivery end (FIG. 1). The conveyor is equipped with a guide (not shown) to properly align the sod pads thereon for optimum cutting orientation as said pads are fed into cutting relationship with cutter assembly 20.

Turning now to the construction of the cutter assemblies (see FIGS. 1, 2 and 3), cutter assembly 20 includes five notched or serrated disc blades 20a attached to and rotatable with shaft 21. These blades are securely spaced two inches apart in seriatim by mounting collar 20b and have their peripheral and cutting edges running tight against the cylindrical surface of mandrel 23. Each of blades 20a is notched every two inches along its cutting edge by approximately one-half inch wide spaces. As the blades 20a come just in contact with the cylindrical surface of mandrel 23, five parallel intermittently spaced cuts or slits are made along the length of the sod pads as they pass therebetween. It is emphasized that the number of blades, spacing between the blades, and the notching interval may be altered without changing the scope of the invention.

In order to keep the disc blades 20a from picking up the sod pad as it is passed between cutter assembly 20 and mandrel 23, spring steel tongues 60 are provided to force the pad downwardly. These tongues are weldedly attached at their forward end to a horizontal rod 61 and extend rearwardly and downwardly therefrom to resiliently contact each longitudinal strip cut in the sod pads. Rod 61 is rotatably supported at each end within brackets 62 which have been bolted to the forward side of sections 15. Finger 63, rigidly welded to rod 61, extends forwardly at a slight angle from the vertical when in an operative position. Finger 63 is connected at its upper portion to the forward vertical beam of section 15 in side 11 by a tension coil spring 64. Spring 64 urges finger 63 inwardly or toward the cutting apparatus and accordingly biases the spring steel tongues 60 downwardly so that a downward force is brought to bear against the sod pad as it passes from cutter assembly 20 to transverse cutter assembly 29.

Transverse cutter assembly 29 is constructed in a different manner and oppositely oriented relative to longitudinal cutter assembly 20. Transverse cutting assembly 29 contains sixteen notched knives so spaced that the tips of the knives or peripheral cutting edges are two inches apart. The knives are supported in a rotatable manner with shaft 30 by a pair of spaced apart retaining plates 65 (see FIGS. 4 and 5). The sixteen (16) notched knives, hereinafter designated by numeral 66, are adjustably mounted on bars 66a which are anchored between plates 65. Bolts 66b extend through slots 66c in bars 66a thereby providing a means for adjusting the outward radial extension of the knives. By loosening bolts 66b, moving knives 66 and retightening bolts 66b, the cutting edges of knives 66 may be either set to tangentially contact rolling mandrel 31 or set inwardly so that a space is allowed to exist between the cutting edges and the outer surface of the mandrel.

All of the knives 66 are identical, each knife containing five (5) one-half inch notches or spaces located every two inches along the cutting edge. As seen in FIG. 3, the notches of the sixteen (16) knives form parallel "bands" around the cylindrical shaped cutter assembly 29 and when properly mounted on the support framework 10, the five blades 20a, of cutter assembly 20 individually lie in a vertical plane that bisects the center of a respective "band" of notches.

In the area between each knife 66 is located a tubular rubber sod stripper 67 which extends along the length of the cutting edge. These sod strippers are mounted between retaining plates 65 by retaining rods 68, same being fastened between plates 65 by an appropriate brad or head. The tubular sod strippers are dimensioned so that the outer surfaces of the strippers contact the sides of knife blades 66 and protrude past the cutting edge of the knives 66 (see FIG. 4). Each rubber tube is resiliently compressible having an appropriate molecular structure to allow themselves to be compressed as the sod pad passes between cutting assembly 29 and mandrel 31. However, the pressure required for compression of the rubber tubes is not sufficient to deform the sod pad in any permanent or harmful manner.

Only the sod strippers in contact with the sod pad will be compressed. When the once compressed strippers move out of contact with the sod pad, the tubular strippers 67 resiliently return to their original shape and "strip" the sod from the knives adjacent thereto.

A flat rectangular metal transfer scraper 69 is welded to the upper surfaces of sections 18 and extends forwardly in close proximity to the output or right-hand side (as viewed in FIG. 1) of mandrel 31 for the purpose of aiding in the depositing of the processed sod pads to a packaging station (not shown).

OPERATION

The operation of the invention, the electric motor 39 (FIG. 3) may be controlled by a conventional OFF-ON push button switch (not shown) usually mounted on the side of the support framework. The electric motor is turned ON prior to using the invention and the turning ON of same powers the worm gear reducer 41 via belt drive 40. The worm gear reducer 41 transmits relatively low speed, high torque rotary motion to shaft 42 and sprocket 43. Sprocket 43 is connected by endless chain 44 with sprocket 45 which in turn is rotatively connected with the main drive shaft 25. As mentioned above, sprocket 46 also rides on shaft 25 and drives a series of other sprockets including mandrel sprockets 47 and 49, idler sprockets 50, 54 and the cutter assembly sprockets 51 and 52 by the endless chain 53. In addition to the rotation of drive sprocket 47 on mandrel shaft 22, sprocket 48 also rotates with said shaft and is drivingly connected via endless chain 56 with the aforementioned conveyor sprocket 55. Accordingly, when the electric motor 39 is turned ON, chains 53 and 56 rotate the conveyor belt 57a in a clockwise direction (as viewed in FIG. 1) while at the same time the notched blades 20a of cutter assembly 20 are rotated in a counterclockwise direction against the outer surface on the clockwise rotating rolling mandrel 23. In a similar manner, endless chain 53 causes the transversely oriented blades 66 of cutter assembly 29 to rotate counterclockwise and its corresponding rolling mandrel 31 to rotate clockwise.

An alternative drive linkage for conveyor belt 57a would have sprocket 48 relocated on idler shaft 24 and an endless chain drivingly connecting said sprocket, conveyor sprocket 55, and optional drive sprockets on transfer roller shafts 36, 37 and 38. Either linkage is suitable for the intended processing of the sod pad, however, the alternative arrangement will add to the transfer characteristics of rollers 36a, 37a and 38a.

The machine is now ready for cutting or slitting sod pads and to thereby form the contiguously attached but easily detachable sod plugs.

According to the design dimensions of the cutting apparatus, the sod pad hereinafter identified by numeral 70, is cut to an appropriate size for ease of handling and operation. A particularly convenient size for sod pads 70, usable with the above described apparatus, is to precut the pad twelve inches wide, sixteen inches long, and one inch thick. As will be seen, this size sod pad will yield 48 two inch square sod plugs per pad after being processed through said apparatus.

The pads 70 are placed on the moving conveyor belt 57a resulting in the initial transporting of same into contact with cutter assembly 20. When a pad 70 reaches the cutter assembly, it has been properly oriented by the appropriate guides (not shown) located on the conveyor. As the blades 20a come in contact with the sod pad, five (5) spaced apart longitudinal cuts with a half-inch space occurring every two inches, are made in sod pads 70 as the pad is moved between the cutting blades 20a and rolling mandrel 23. This cutting procedure results in an approximately two inch wide strip of sod on either side of each end blade 20a which extends parallel with the four (4) two inch wide strips of sod cuts or slit by the interior blades.

Cutter assembly 20 itself provides a rearward momentum to sod pad 70 in the direction of transverse cutter assembly 29. The pad is pushed onto the upper surface of transfer rollers 36a, 37a and 38a by cutter assembly 20 and is moved rearwardly until it is engaged by the transversely oriented cutting blades 66 of cutter assembly 29.

Blades 66 may be set to come into contact with mandrel 31, therefore, a transverse cut or slit is made through pads 70 with the two inch cuts separated by half inch sod attachments. FIG. 6 shows the bottom of a cut sod pad, the longitudinal cuts are represented by numeral 71 and the transverse cuts are represented by the numeral 72. This grid-like cut results when cutter assembly 29 has been set to sever the entire thickness of the sod pad, with the exception of the connected areas remaining due to the presence of the notches. The plugs in said pad remain contiguously attached due to these uncut attachments, designated as 70a in FIG. 7. The fact that blades 20a lie in vertical planes that bisect the notches of knives 66 cause a longitudinal cut 71 to occur either close to or in each unsevered portion along the length of the transverse cut 72. This arrangement aids in the forming of easily detachable but contiguously attached sod plugs.

As mentioned supra, the radial distance at which knives 66 extend can be varied. This allows the knives 66 to be set inwardly towards shaft 30 thusly leaving a space between the peripheral cutting extremity of the blades and the outer surface of rolling mandrel 31. Accordingly, the transverse cutter assembly 20 will not slit or cut completely through sod pad 70 and the lower surface area portion will be unsevered transversely. This lower area portion serves to hold the plugs and prevents unwanted disengagement from the pad. As the pad leaves or has passed between cutter assembly 29 and cylindrical drum 31, a transfer scraper 69 will contact the under side of the pad and thusly form a type of gravity discharge chute allowing the appropriately perforated, but still intact pad, to be immediately packaged.

In actual practice, it is considered economically feasible to package two sod pads in a single package thus making a total of 96 Zoysia plugs, 48 per pad. Linear speed of the pads as they travel through the machine should be determined only by how fast the packager at the output end of the machine can handle the outcoming processed pads.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodnments may be made of the invention without departing from the scope thereof, it is to be understood that all matter herein set forth as shown in the accompanying drawings is to be interpreted as illustrative and not in a limiting sense.

Having thus described my invention, I claim:

1. Apparatus for processing thick, tough, fibrous and resilient materials such as sod pads into contiguously attached sod plugs comprising
    a first cutter station, said station including a first cutter means for receiving and supporting said sod pads and for making a series of parallel spaced apart longitudinal slits in said pads,
    a second cutter station, said second station including a second cutter means for receiving and supporting said longitudinally slit pads and for making a series of parallel spaced apart slits transverse to said longitudinal slits in said pads, said first cutter means and said second cutter means being arranged relative to each other so that said longitudinal slits are not coincident with said transverse slits, and
    means for transporting the sod pads from said first station to said second station.

2. The invention in claim 1 wherein said apparatus includes a conveyor, said conveyor operable to transport said sod pads thereon into cutting relationship with said first cutter station.

3. The invention in claim 1 wherein said first cutter means includes a plurality of rotatable blades, said blades having notches spaced at regular intervals along the cutting edges thereof, said blades being rotatably mounted with respect to the movement of said sod pads so as to make said series of parallel spaced apart longitudinal slits therein.

4. The invention in claim 3 wherein said second cutter means includes a plurality of knives rotatable with a horizontally oriented shaft, said knives having notches spaced at regular intervals along the cutting edges thereof, and said knives being transversely oriented with respect to said blades of said first cutter means so as to make said series of parallel spaced apart slits transverse to said longitudinal slits in said pad.

5. The invention in claim 4 wherein said first cutter means includes a first rolling mandrel located in close proximity to the blades of said first means and wherein said second cutter means includes a second rolling mandrel in close proximity to the knives of said second means, said rolling mandrels operable to support and assist in the movement of said sod pads as said cutting edges of said first and second cutter means come in contact with said pads.

6. The invention in claim 5 wherein said blades of said first and second cutter means contact the upper surface of said first and second mandrel respectively, said second cutter means having a means for backing said knives away from contact with the upper surface of said second mandrel thereby limiting the depth of the transverse slits.

7. The invention in claim 6 wherein each blade of said first cutter means lies in a different parallel vertical plane, each vertical plane bisecting a different notched portion of said notched knives of said second cutter means, there being an equal number of notches per knife as there are blades.

8. The invention in claim 7 wherein said transporting means includes a plurality of transfer rollers located between said first rolling mandrel and said second rolling mandrel, the top surface of said transfer rollers lying in the same plane as the top surface of said rolling mandrels.

9. The invention of claim 8 wherein an inclined transfer scraper is located in proximity to the output side of said second cutter means, said scraper providing a delivery chute for the processed sod pads.

10. The invention in claim 9 wherein a spring tongue arrangement is interleaved between the blades of said first cutter means and biased downwardly, the tongue arrangement operable to disengage said sod pads from the blades of said first cutter assembly.

11. The invention of claim 10 wherein said second cutter means includes a pair of circular retaining plates with the plurality of said notched knives mounted therebetween, and means for disengaging said sod pads from said knives.

12. The invention in claim 11 wherein said disengaging means includes a compressible rubber tube located along the length of and between each of said knives and having a portion protruding beyond the cutting edge of said knives, said tubes operable to compress when coming into contact with said sod pads on the upper surface of said second rolling mandrel and to return to their original shape after said pad moves past the uppermost surface of said rolling mandrel.

13. A method for slitting sod pads to form contiguous attached yet easily detachable sod plugs therein, comprising the steps of
    conveying said sod pads into cutting relationship with the first cutter assembly,
    cutting a first set of parallel longitudinal slits substantially the entire length of and into one surface of said pad,
    transporting the longitudinally cut pad thence into cutting relationship with a second cutter assembly, cutting a second set of parallel slits across substantially the entire width of the same surface substantially transverse to said longitudinal slits, each of said transverse cuts intermittently severing said pad, said pad remaining intact between said intermittent severings along the length of said transverse cuts, said intact portions along said transverse cuts being bisected by said intermittent severings of said longitudinal cuts.

14. The invention as in claim 13 wherein each of said transverse slits intermittently severs said pad to a limited depth, said pad remaining intact between said intermittent severings along the length of said transverse slits and below said limited severing depth of said transverse slits.

References Cited

UNITED STATES PATENTS

| | | | |
|---|---|---|---|
| 1,808,500 | 6/1931 | Holny | 83—303 X |
| 1,911,786 | 5/1933 | Barmakian | 83—300 X |
| 1,986,074 | 1/1935 | Spang | 83—11 X |
| 3,255,651 | 6/1966 | Huck | 83—405 X |

JAMES M. MEISTER, Primary Examiner

U.S. Cl. X.R.

83—121, 303, 678, 925